J. E. GLEASON, A. L. STEWART & W. H. SNOW.
GEAR CUTTING MACHINERY.
APPLICATION FILED MAR. 12, 1917.
1,236,835.
Patented Aug. 14, 1917.
3 SHEETS—SHEET 1.
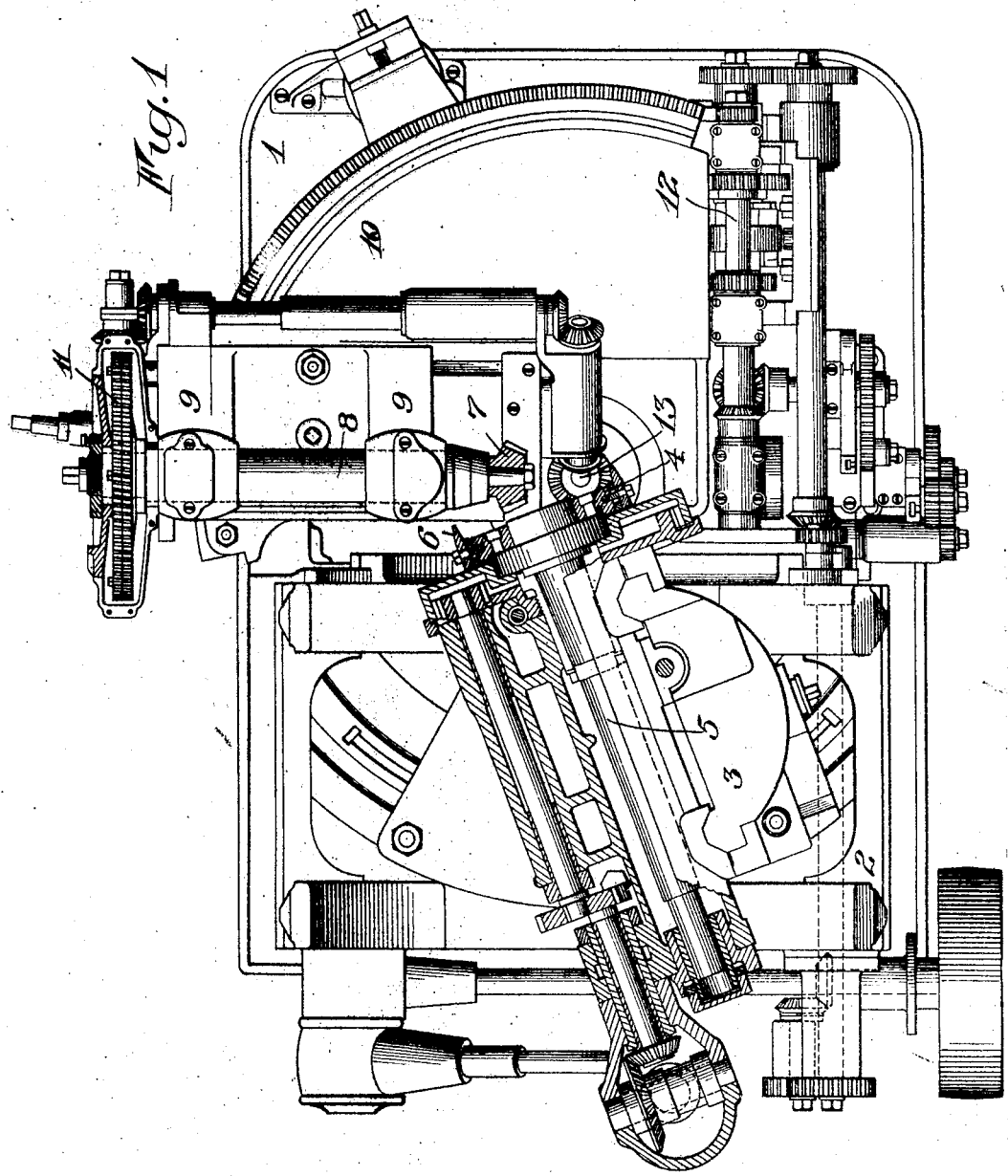
Witnesses
H. E. Stonebraker
INVENTORS
James E. Gleason, Arthur L. Stewart
Wilbur H. Snow
BY
their ATTORNEYS

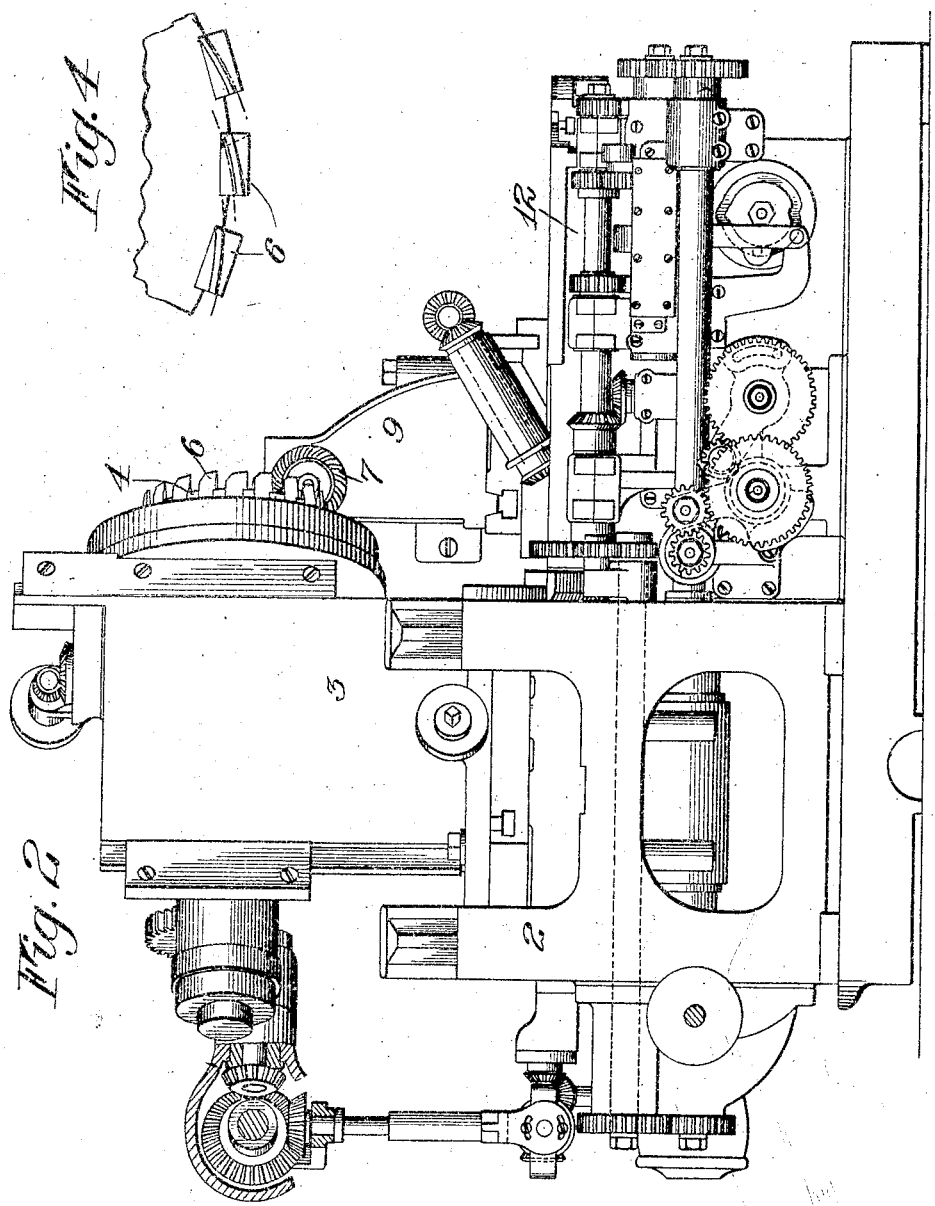

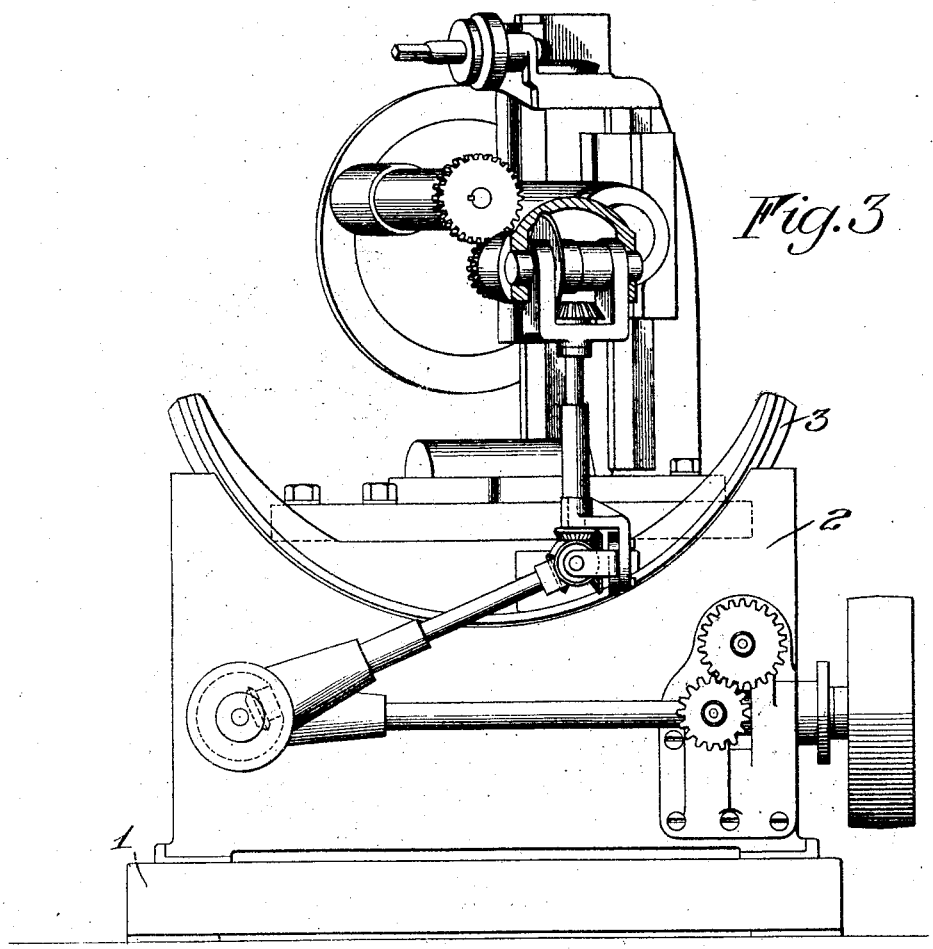

UNITED STATES PATENT OFFICE.

JAMES E. GLEASON, ARTHUR L. STEWART, AND WILBUR H. SNOW, OF ROCHESTER, NEW YORK, ASSIGNORS TO GLEASON WORKS, OF ROCHESTER, NEW YORK, A CORPORATION OF NEW YORK.

GEAR-CUTTING MACHINERY.

1,236,835.

Specification of Letters Patent. Patented Aug. 14, 1917.

Application filed March 12, 1917. Serial No. 154,177.

*To all whom it may concern:*

Be it known that we, JAMES E. GLEASON, ARTHUR L. STEWART, and WILBUR H. SNOW, all of Rochester, in the county of Monroe and State of New York, have invented certain new and useful Improvements in Gear-Cutting Machinery; and we do hereby declare the following to be a full, clear, and exact description of the same, reference being had to the accompanying drawings, forming a part of this specification, and to the reference-numerals marked thereon.

The invention relates to machines for generating bevel gears having teeth which are curved longitudinally or from end to end and is in the nature of an improvement on the construction disclosed in an application filed by James E. Gleason and Arthur L. Stewart, December 26, 1914, Serial No. 879,026, embodying a type of mechanism in which the blank is given a continuous indexing movement and the cutter head carries a series of tools which succesively engage different teeth of the blank during each rotation of the cutter head. The present invention is intended to adapt the machine of the former application to the production of bevel gears according to a system of generation that involves effecting a relative rolling or generating movement between the blank and the cutter, such as would take place if the blank were rolled upon a mating bevel gear or conical section. To these and other ends the invention consists in certain improvements and combinations of parts all as will be hereinafter more fully described, the novel features being pointed out in the claims at the end of the specification.

In the drawings:

Figure 1 is a plan view, partly in section, of a machine illustrating the invention;

Fig. 2 is a side elevation;

Fig. 3 is an end elevation, and

Fig. 4 is a detail view in elevation of a portion of the cutter.

Similar reference numerals in the several figures indicate the same parts.

In so far as the present structure resembles the machine of the pending application previously mentioned, it includes a rotary face milling cutter consisting of a tool head carrying a series of tools or cutters arranged in spaced relation to each other concentrically of the head, the disposition of the tools being such that when the tool head rotates in engagement with and across the face of a continuously rotating blank, the cutters or individual tools successively engage different portions of the blank, each operating to make a single cut on the side of a tooth until all the teeth are completed and thus producing a curved slot or tooth. This result may be obtained by arranging the tools so as to engage corresponding sides of every other tooth, or arranging them in pairs or sets to engage adjacent sides of adjacent teeth. The first mentioned arrangement requires two revolutions of the blank to make a cut on one side of each tooth, while the latter arrangement requires but one revolution of the blank to make one cut on both sides of each tooth.

In addition to the indexing movement of the blank carrier, the latter is also controlled in such manner as to have imparted to it a relative rolling or profile generating movement with reference to the tool in operation at any particular moment, for the purpose of generating or automatically producing theoretically correct sides on the teeth, and this is accomplished by rolling both the tool head and the blank, which are geared together, so that the rolling movement of the tool head, which is mounted on an automatically oscillated support, is transmitted to the gear blank, and this rolling motion of the tool head is added to or subtracted from the indexing movement of the blank by differential gearing, according to whether the direction of the roll is the same as or contrary to the indexing movement of the blank. In the application above mentioned, the relative rolling motion is such as to produce the effect of rolling the gear blank upon a plane surface, a section of which is represented by the tool in operation, whereas in the present machine the relative roll is such as to produce an effect as though the gear blank were rolled upon a mating bevel gear or segment, or upon a section or segment of a cone, an element of which is represented by the cutter. In the previous case, the purpose was, in effect, to roll the gear blank on a plane or flat surface, whereas in the present arrangement the effect is that of rolling the gear blank on a conical or beveled surface and it will be understood that this relation may obtain by imparting the rolling motion either to the blank carrier or to the cutter support or to both. In the present arrangement, the motion is partly on both, the cutter head being mounted on an oscillatory cradle that is rocked back and forth while the blank carrier is slowly rotated during the cutting operation.

In this general class of work, it is customary to rough the gear blanks on one machine and subsequently finish them on another, and the present apparatus can be utilized either for finishing a blank in which the rough cuts have previously been made, or in making a completed operation by entirely finishing the teeth without any previous roughing operation.

In the arrangement shown, 1 designates the base which is provided with a standard 2 for the cutter mechanism. The latter is carried on a suitable support or cradle which includes guides 3 traveling in ways or tracks on the standard 2, and which is oscillated back and forth by instrumentalities such as disclosed in the pending application referred to, and which forms no part of the present improvement. The cutter head is designated generally by 4 and is carried by the rotary cutter spindle 5 while 6 designate the individual cutters or tools which are arranged on the cutter head in such manner as to successively pass through separate tooth spaces, as described in the pending application and as indicated in Fig. 4.

The gear blank to be operated on is designated at 7, and 8 is the gear blank carrier or spindle suitably arranged in the standard 9 which is mounted upon an oscillatory table 10. The index mechanism is designated generally by 11, while 12 indicates the reversing mechanism that is employed for alternately rocking the cradle and cutter mechanism in opposite directions for effecting proper profile generation of the tooth faces. The table 10 is adapted for swinging movement about the central axis 13 when operating on a blank which has not previously been roughened, thus permitting the blank to be fed in, so that the tools will cut to their full depths, that is, down to the root angle. The machine may also be employed to finish-cut blanks in which rough cuts have already been made on a roughing machine, in which case the table 10 would be held in fixed position. In order to effect the necessary swinging or feeding movement of the table, a suitable cam or other mechanism may be employed such as shown in Patent No. 1,203,608, November 7, 1916.

During the cutting operation, the blank has continuous rotation, while the cutter is rotating across the face of the blank and at the same time the cutter mechanism is rolling bodily by reason of the movement of the cradle, to impart the desired generated shape to the sides of the teeth. The gear blank axis extends in a direction parallel to the guides 3 and to the direction of roll of the cutter supporting cradle, and the axis of the cutter is located at an angle other than a right angle, both with reference to the gear blank axis and to the direction of movement of the cutter supporting cradle. The result of this is that the outermost points of the cutters, or the plane in which such portions of the cutter travel, sweeps out a section of a conical surface as the cutter supporting cradle is oscillated, and this movement takes place during the cutting operation and with reference to the gear blank so that the shape imparted to the teeth on the blank is the same as though the blank were rolled on a mating bevel gear, or on a conical surface during the cutting operation, the tool in operation at any moment constituting an element of such conical surface. The effect may be obtained as in the present instance by rolling the cutter support while the cutter is operating, or by rolling the blank past the cutter, without affecting the purpose of the invention, which resides in having successive tools on a rotary cutter head engage correspondingly successive portions of a continuously rotating gear blank, and positioning the gear blank with reference to the cutter so that when one is rolled with reference to the other for generating the sides or profiles of the teeth, the effective shape will be that afforded by rolling the blank upon a conical surface or a mating bevel gear.

After the tool head rolls to the limit of its movement in one direction its movement is reversed and the cutting operation may take place during rolling of the tool head in both directions, although it may be desirable to withdraw the blank from cutting relation with the tool head during the reverse movement of the cradle and to this end, mechanism may be employed such as described in the pending application already referred to.

We claim as our invention:

1. In a machine for producing curved gear teeth, the combination with a blank carrier, a cutter, means for effecting relative movement thereof to cut a curved slot, and indexing devices for imparting a continuous indexing movement to the blank carrier to present successive portions of the blank to the cutter, of means acting to produce a relative profile generating movement between the blank and the cutter corresponding to the relative movement of the blank and a mating bevel gear when one is rolling upon the other.

2. In a machine for producing curved gear teeth, the combination with a blank carrier, a cutter, means for effecting relative movement thereof to cut a curved slot, and indexing means for imparting a continuous indexing movement to the blank carrier to present successive portions of the blank to the cutter, of means acting to produce a profile generating movement of the cutter past the blank corresponding to rolling the blank on a bevel segment an element of which is represented by the cutter.

3. In a machine for producing curved gear teeth, the combination with a blank carrier, a cutter, means for effecting relative movement thereof to cut a curved slot, and indexing means for imparting a continuous indexing movement to the blank carrier to present successive portions of the blank to the cutter, of means acting to produce a relative profile generating movement between the blank and the cutter corresponding to the movement of the blank on a conical section of a mating bevel gear.

4. In a machine for producing curved gear teeth, the combination with a blank carrier, a rotary face cutter movable across the face of the blank in a curved path to cut a curved slot, and indexing means for imparting a continuous indexing movement to the blank carrier to present successive portions of the blank to the cutter, of means acting to produce a relative profile generating movement between the blank and cutter corresponding to the relative movement of the blank and a mating bevel gear when one is rolling upon the other.

5. In a machine for producing curved gear teeth, the combination with a blank carrier, a rotary face cutter movable across the face of the blank in a curved path to cut a curved slot, and indexing means for imparting a continuous indexing movement to the blank carrier to present successive portions of the blank to the cutter, of means acting to produce a profile generating movement of the cutter past the blank corresponding to rolling the blank on a bevel segment an element of which is represented by the cutter.

6. In a machine for producing curved gear teeth, the combination with a blank carrier, a rotary face cutter movable across the face of the blank in a curved path to cut a curved slot, and indexing means for imparting a continuous indexing movement to the blank carrier to present successive portions of the blank to the cutter, of means acting to produce a relative profile generating movement between the cutter and blank corresponding to the movement of the blank on a conical section of a mating bevel gear.

7. In a machine for producing curved gear teeth, the combination with a blank carrier, a rotary face cutter movable across the face of the blank in a curved path to cut a curved slot, and indexing means for imparting a continuous indexing movement to the blank carrier to present successive portions of the blank to the cutter, of means acting to produce a profile generating movement of the cutter past the blank in a direction at an acute angle to the rotary axis of the cutter.

8. In a machine for producing curved gear teeth, the combination with a blank carrier, a rotary face cutter movable across the face of the blank in a curved path to cut a curved slot, and indexing means for imparting a continuous indexing movement to the blank carrier to present successive portions of the blank to the cutter, of means acting to produce a profile generating movement of the cutter bodily past a blank in the direction parallel to the gear blank axis.

9. In a machine for producing curved gear teeth, the combination with a blank carrier, a rotary face cutter movable across the face of the blank in a curved path to cut a curved path, and indexing means for imparting a continuous indexing movement to the blank carrier to present successive portions of the blank to the cutter, of means acting to produce a profile generating movement of the cutter past the blank, the axis of which blank is parallel to the direction of said generating movement of the cutter, while the axis of the cutter is arranged at some angle other than a right angle with reference to the axis of the blank carrier.

JAMES E. GLEASON.
ARTHUR L. STEWART.
WILBUR H. SNOW.